United States Patent
Adachi et al.

(10) Patent No.: US 10,013,606 B2
(45) Date of Patent: Jul. 3, 2018

(54) IMAGE PROCESSING APPARATUS, NON-TRANSITORY COMPUTER READABLE MEDIUM, AND IMAGE PROCESSING METHOD

(71) Applicant: FUJI XEROX CO., LTD., Tokyo (JP)

(72) Inventors: Shintaro Adachi, Kanagawa (JP); Katsuya Koyanagi, Kanagawa (JP); Shigeru Okada, Kanagawa (JP); Hiroyuki Kishimoto, Kanagawa (JP); Kunihiko Kobayashi, Kanagawa (JP); Akane Yoshizaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/990,185

(22) Filed: Jan. 7, 2016

(65) Prior Publication Data

US 2017/0091544 A1 Mar. 30, 2017

(30) Foreign Application Priority Data

Sep. 28, 2015 (JP) ................................. 2015-189254

(51) Int. Cl.
G06K 9/62 (2006.01)
G06K 9/00 (2006.01)
G06K 9/68 (2006.01)
G06F 21/62 (2013.01)

(52) U.S. Cl.
CPC ..... *G06K 9/00456* (2013.01); *G06F 21/6254* (2013.01); *G06K 9/00463* (2013.01); *G06K 9/6878* (2013.01); *G06K 2209/01* (2013.01)

(58) Field of Classification Search
CPC .......... G06K 9/00456; G06K 9/00463; G06K 9/6878; G06K 2209/01
See application file for complete search history.

(56) References Cited

U.S. PATENT DOCUMENTS

| | | | |
|---|---|---|---|
| 2009/0323087 A1* | 12/2009 | Luo ..................... | G06F 17/2288 358/1.9 |
| 2012/0294524 A1* | 11/2012 | Zyuzin ..................... | H04N 1/41 382/166 |
| 2013/0004076 A1* | 1/2013 | Koo ........................ | G06K 9/228 382/176 |
| 2014/0112526 A1* | 4/2014 | Kim ......................... | G06K 9/72 382/103 |
| 2016/0110352 A1* | 4/2016 | Bendersky ........ | G06F 17/30011 707/602 |

FOREIGN PATENT DOCUMENTS

JP  2009-211205 A  9/2009

* cited by examiner

*Primary Examiner* — Phuoc Tran
(74) *Attorney, Agent, or Firm* — Oliff PLC

(57) ABSTRACT

An image processing apparatus including a classifying unit and a replacing unit. The classifying unit classifies an input image into a category among plural categories. The replacing unit replaces a portion of the input image with a first image in a case where the category into which the input image is classified by the classifying unit is corrected by a user to a correct category among the plural categories.

15 Claims, 9 Drawing Sheets

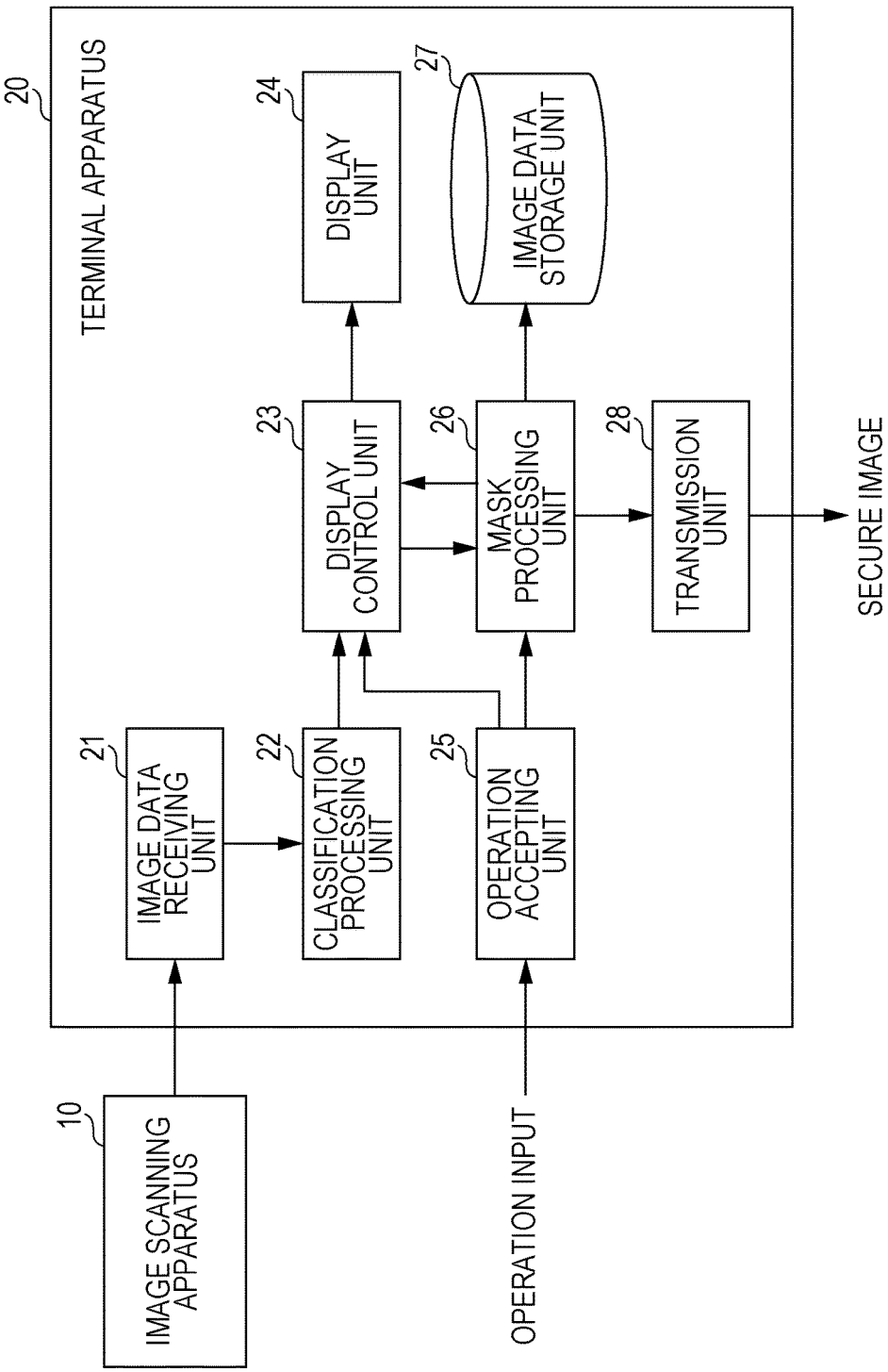

FIG. 8A
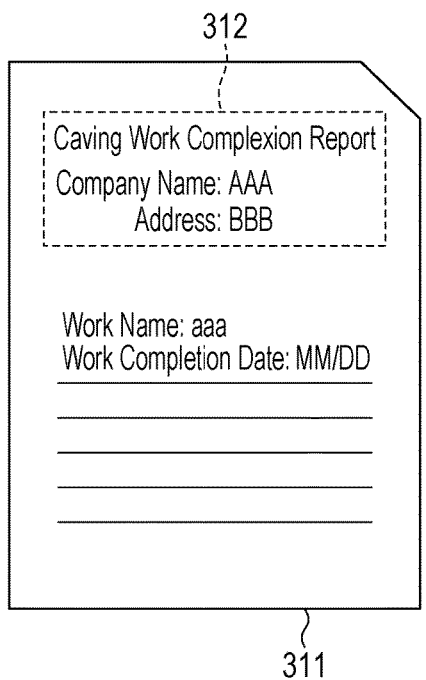
FIG. 8B
Regular Expressious by Replacement of One Character
  (*aving Work Completion Report)
  (P*ving Work Completion Report)
  :
  (Paving Work Com*letion Report)
  :
Regular Expressious by Replacement of Two Characters
  (**ving Work Completion Report)
  (*aving *ork Completion Report)
  :
  (*aving Work Com*letion Report)
FIG. 8C
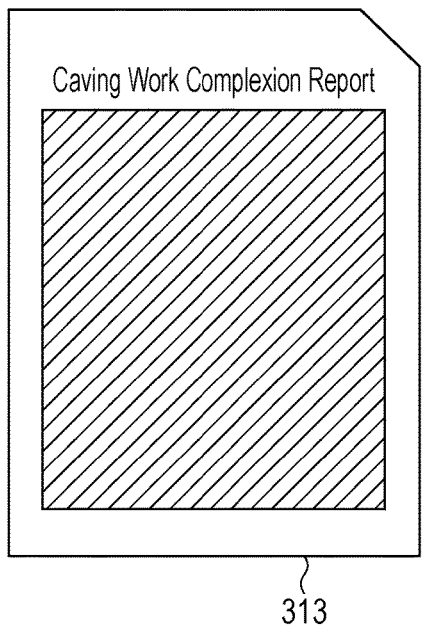

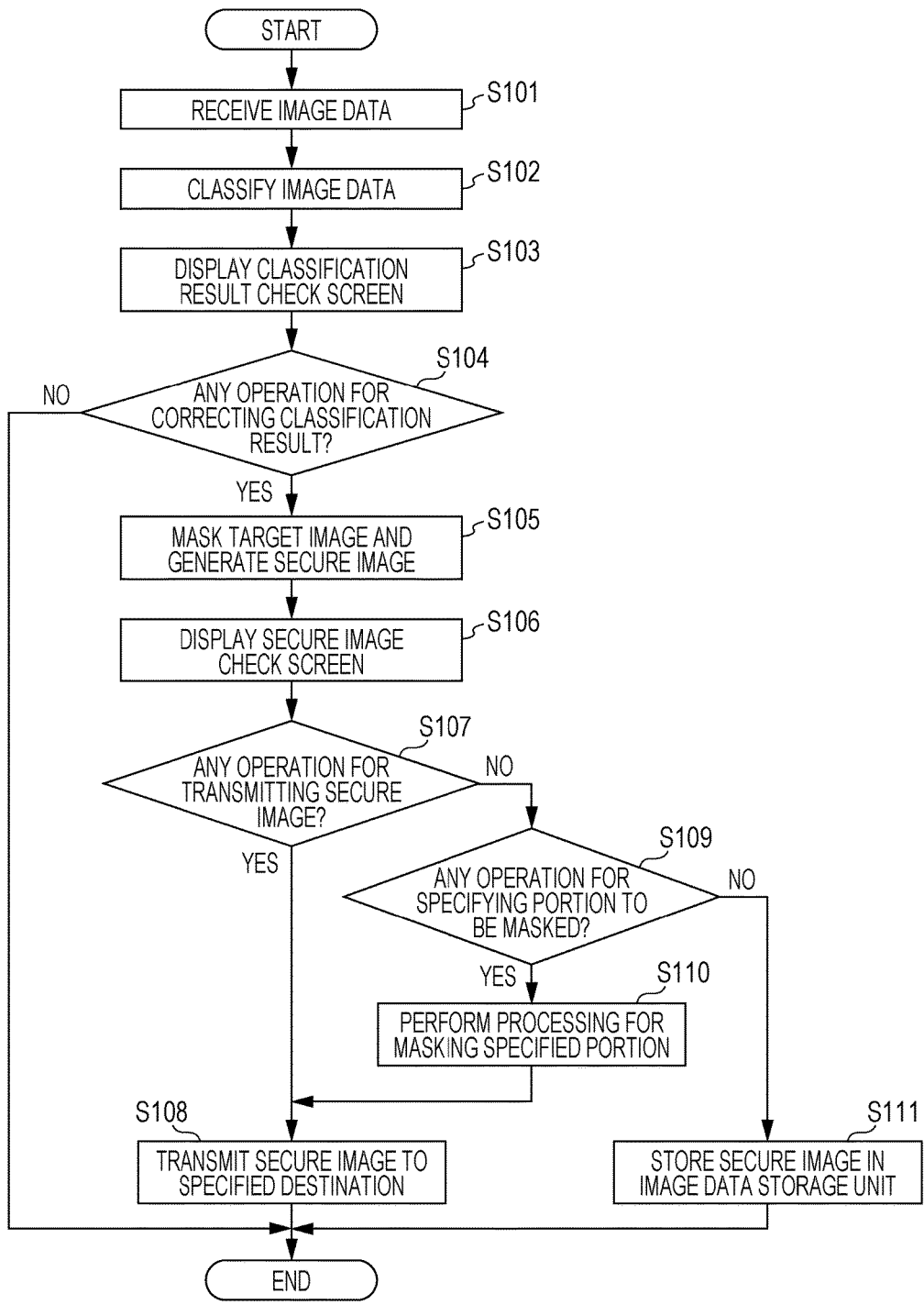

IMAGE PROCESSING APPARATUS, NON-TRANSITORY COMPUTER READABLE MEDIUM, AND IMAGE PROCESSING METHOD

CROSS-REFERENCE TO RELATED APPLICATIONS

This application is based on and claims priority under 35 USC 119 from Japanese Patent Application No. 2015-189254 filed Sep. 28, 2015.

BACKGROUND (i) Technical Field

The present invention relates to an image processing apparatus, a non-transitory computer readable medium, and an image processing method.

(ii) Related Art

Techniques for performing a classification process on images including confidential information, such as customer information, are available.

SUMMARY

According to an aspect of the invention, there is provided an image processing apparatus including a classifying unit and a replacing unit. The classifying unit classifies an input image into a category among plural categories. The replacing unit replaces a portion of the input image with a first image in a case where the category into which the input image is classified by the classifying unit is corrected by a user to a correct category among the plural categories.

BRIEF DESCRIPTION OF THE DRAWINGS

An exemplary embodiment of the present invention will be described in detail based on the following figures, wherein:

FIG. 4 illustrates an example of a functional configuration of the terminal apparatus according to the exemplary embodiment;

FIGS. 8A to 8C describe another example of the masking process; and

FIG. 9 is a flowchart illustrating an example of a procedure of the masking process.

DETAILED DESCRIPTION

An exemplary embodiment of the present invention will be described in detail below with reference to the accompanying drawings.

Overall Configuration of Image Processing System

Figure 1:
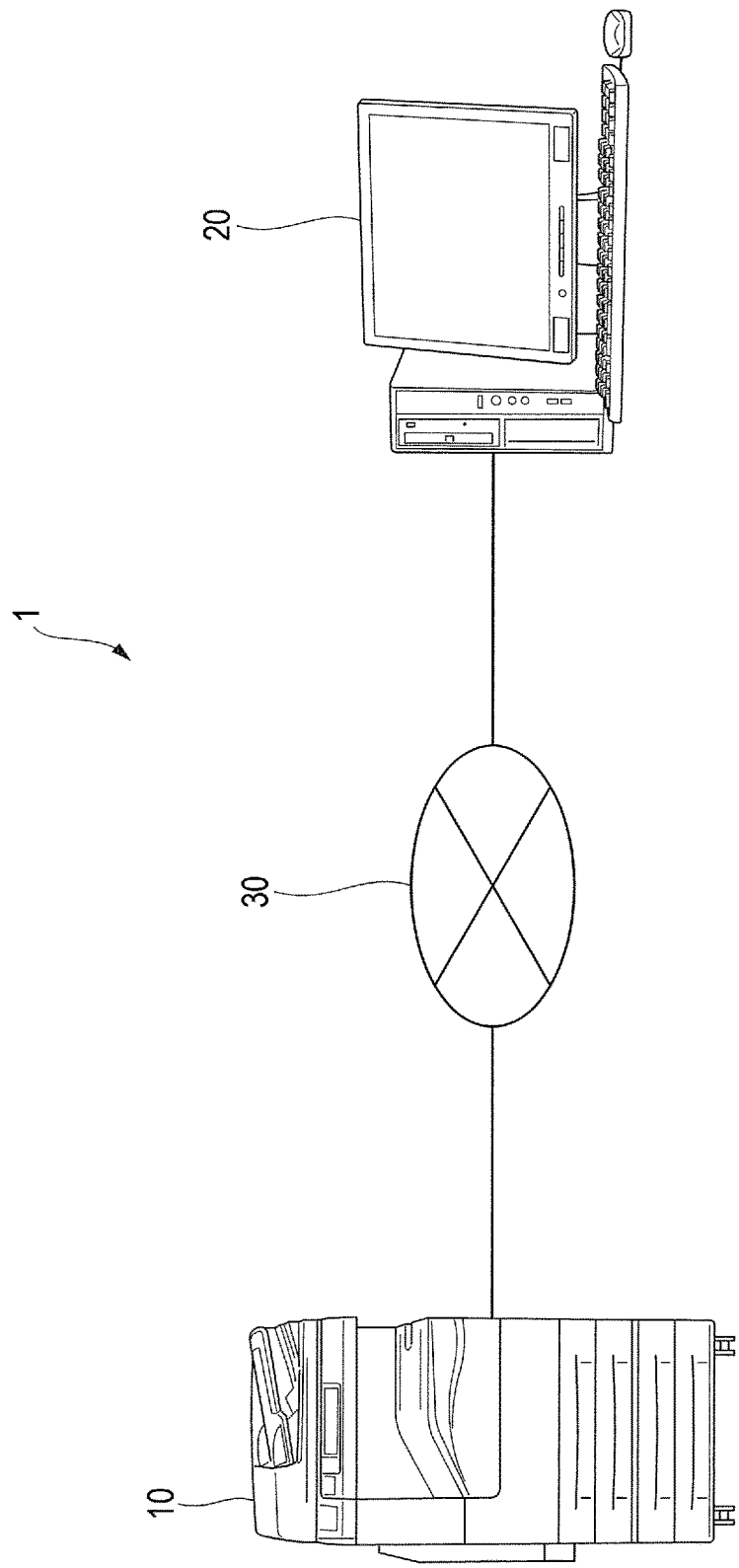
FIG. 1 illustrates an example of the overall configuration of an image processing system according to an exemplary embodiment.

The overall configuration of an image processing system 1 according to an exemplary embodiment will be described first. FIG. 1 illustrates an example of the overall configuration of the image processing system 1 according to the exemplary embodiment. The image processing system 1 according to the exemplary embodiment is a system for classifying documents including confidential information, such as forms. Specifically, in the image processing system 1, various kinds of documents, such as delivery slips and invoices, are positioned and scanned, and classification is performed in accordance with contents of the documents. As a result of classification of the documents, for example, the user is able to check the contents of the documents in the classified state or to process the documents in accordance with the flow set for each category.

As illustrated in FIG. 1, the image processing system 1 includes an image scanning apparatus 10 that scans an image on a document and generates image data and a terminal apparatus 20 that receives the image data from the image scanning apparatus 10 via a network 30 and classifies the image data.

The image scanning apparatus 10 has a scan function. Specifically, the image scanning apparatus 10 scans an image on a document (sheet), such as a form, and generates image data representing the scanned image. For example, the image scanning apparatus 10 may be a scanner. The image scanning apparatus 10 employs, for example, a charge coupled device (CCD) system in which reflected light of light radiated onto a document from a light source is reduced with a lens in terms of the magnification and then is received with a CCD sensor or a contact image sensor (CIS) system in which reflected light of light sequentially radiated onto a document from light-emitting diode (LED) light sources is received with a CIS. Note that the image scanning apparatus 10 may have, for example, a print function, a copy function, and a fax function in addition to the scan function.

The terminal apparatus 20 receives, via the network 30, image data generated by the image scanning apparatus 10 and classifies the received image data. The terminal apparatus 20 also presents an image data classification result to the user by displaying it on a screen. For example, a personal computer (PC) may be used as the terminal apparatus 20. In the exemplary embodiment, the terminal apparatus 20 has exemplary functions of an image processing apparatus.

The network 30 is a communication medium used for information communication between the image scanning apparatus 10 and the terminal apparatus 20. The network 30 is, for example, a local area network (LAN).

The terminal apparatus 20 presents the image data classification result to the user by displaying it. The classification result is sometimes incorrect. That is, image data is sometimes classified into a category (category type) different from a category to which the image data is supposed to be classified.

In the exemplary embodiment, in the case where the classification result is incorrect, the terminal apparatus 20 performs, in response to the user correcting the classification (category), a masking process on the image data in accordance with the correct classification. Then, the terminal apparatus 20 displays an image resulting from masking so as to allow the user to check whether confidential information is hidden. After the check by the user, the terminal apparatus 20 transmits the image data resulting from masking to, for example, an outside maintenance personnel to have the outside maintenance personnel to investigate the cause of the incorrect classification.

Hardware Configuration of Image Scanning Apparatus

Figure 2:
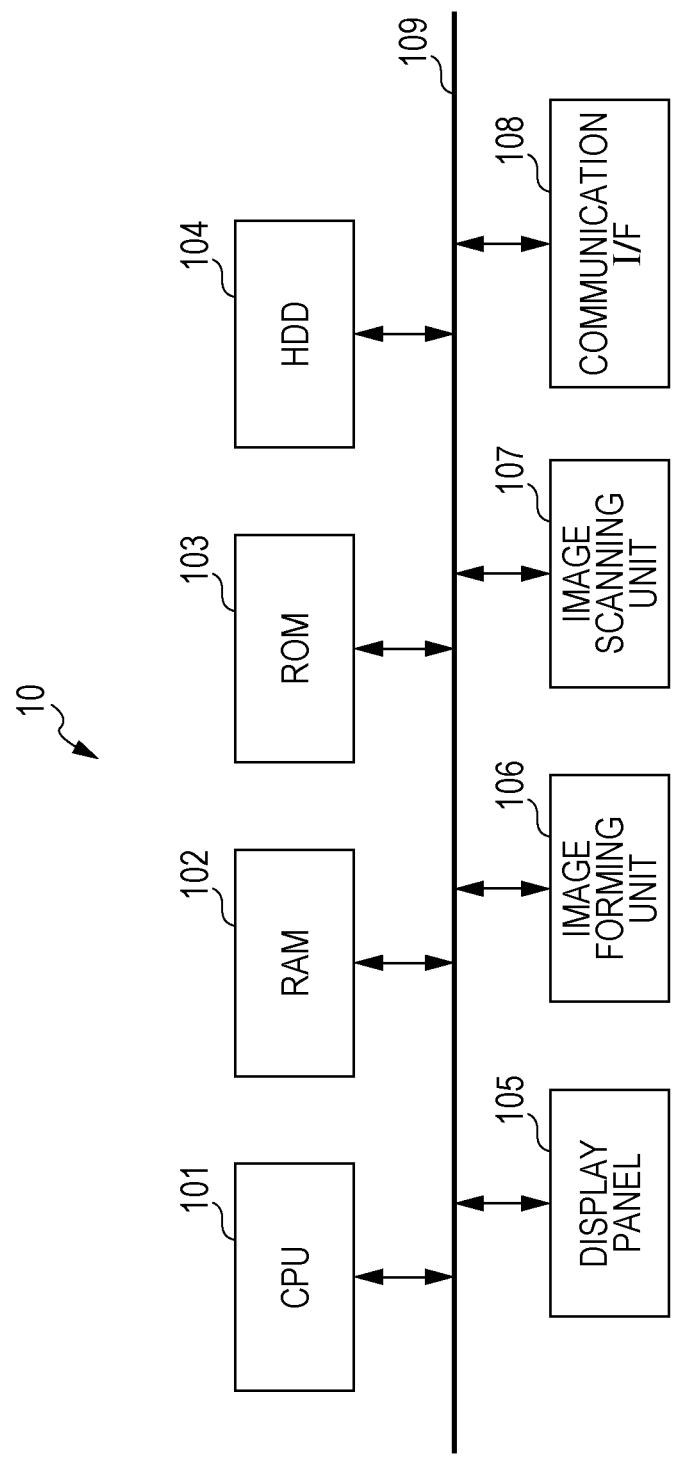
FIG. 2 illustrates an example of a hardware configuration of an image scanning apparatus according to the exemplary embodiment.

A hardware configuration of the image scanning apparatus 10 will be described next. FIG. 2 illustrates an example of the hardware configuration of the image scanning apparatus 10 according to the exemplary embodiment. As illustrated in FIG. 2, the image scanning apparatus 10 includes a central processing unit (CPU) 101, a random access memory (RAM) 102, a read-only memory (ROM) 103, a hard disk drive (HDD) 104, a display panel 105, an image forming unit 106, an image scanning unit 107, and a communication interface (I/F) 108. The CPU 101, the RAM 102, the ROM 103, the HDD 104, the display panel 105, the image forming unit 106, the image scanning unit 107, and the communication I/F are connected to and exchange data with one another via a bus 109.

The CPU 101 executes various programs, such as an operating system (OS) and applications. The RAM 102 is a memory used as, for example, a working memory of the CPU 101. The ROM 103 is a memory that stores, for example, the various programs executed by the CPU 101. The CPU 101 loads the various programs stored in the ROM 103 or the like into the RAM 102 and executes the various programs, thereby implementing functions of the image scanning apparatus 10. The HDD 104 is a storage space that stores, for example, data input to and output from the various programs.

The display panel 105 displays various kinds of information and accepts an operation input from the user.

The image forming unit 106 forms an image on a recording medium in accordance with input image data. For example, the image forming unit 106 employs an electrophotographic system in which an image is formed by transferring toner on a photoconductor member onto a recording medium or an inkjet system in which an image is formed by ejecting ink onto a recording medium.

The image scanning unit 107 scans an image on a document and generates image data representing the scanned image.

The communication I/F 108 functions as an interface that allows the image scanning apparatus 10 and an external device such as the terminal apparatus 20 to transmit and receive various kinds of data via the network 30.

Hardware Configuration of Terminal Apparatus

Figure 3:
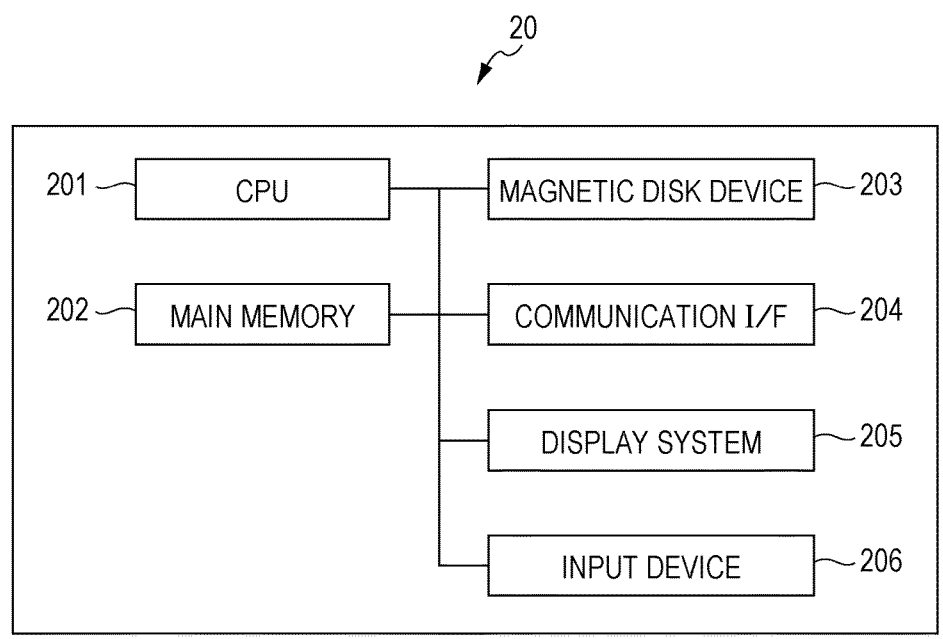
FIG. 3 illustrates an example of a hardware configuration of a terminal apparatus according to the exemplary embodiment.

A hardware configuration of the terminal apparatus 20 will be described next. FIG. 3 illustrates an example of the hardware configuration of the terminal apparatus 20 according to the exemplary embodiment. As illustrated in FIG. 3, the terminal apparatus 20 includes a CPU 201, a main memory 202, and a magnetic disk device 203. The CPU 201 serves as a processor, whereas the main memory 202 and the magnetic disk device 203 serve as memory devices.

The CPU 201 executes various programs, such as an OS and applications, thereby implementing functions of the terminal apparatus 20. The main memory 202 is a storage space that stores, for example, the various programs and data used during execution of the various programs. The magnetic disk device 203 is a storage space that stores, for example, data input to and output from the various programs. The terminal apparatus 20 further includes a communication I/F 204, a display system 205, and an input device 206, such as a keyboard or a mouse. The communication I/F 204 allows the terminal apparatus 20 and an external apparatus to perform communication. The display system 205 includes a video memory and a display.

Functional Configuration of Terminal Apparatus

A functional configuration of the terminal apparatus 20 will be described next. FIG. 4 illustrates an example of a functional configuration of the terminal apparatus 20 according to the exemplary embodiment.

The terminal apparatus 20 includes an image data receiving unit 21, a classification processing unit 22, a display control unit 23, a display unit 24, an operation accepting unit 25, a mask processing unit 26, an image data storage unit 27, and a transmission unit 28. The image data receiving unit 21 receives image data from the image scanning apparatus 10 via the network 30. The classification processing unit 22 classifies the received image data. The display control unit 23 controls a display screen. The display unit 24 displays various screens. The operation accepting unit 25 accepts an operation input from the user. The mask processing unit 26 performs a masking process on the image data. The image data storage unit 27 stores the image data. The transmission unit 28 transmits the image data to outside.

The image data receiving unit 21 receives, from the image scanning apparatus 10 via the network 30, image data that has been generated by the image scanning unit 107 by scanning an image on a document.

The classification processing unit 22 classifies the image data (hereinafter, referred to as a target image) received by the image data receiving unit 21. Specifically, the classification processing unit 22 recognizes characters included in the target image, for example, by using optical character recognition (OCR) and classifies the target image in accordance with the recognized characters. OCR is a technique for analyzing characters included in image data and converting the characters into character data handled by computers. In the exemplary embodiment, the target image is used as an example of an input image.

Specifically, since the format of each form is known in advance, a rule for classifying each target image (hereinafter, referred to as a classification rule) is set in advance in accordance with contents of the form. For example, in the case where the form is an invoice, it is known in advance that the form includes a character string "Invoice" somewhere. Accordingly, for example, a classification rule is set in advance such that a target image is classified into a category (type of the document) "Invoice" if a region specified in the target image by using, for example, coordinate information includes the character string "Invoice".

In this manner, the classification processing unit 22 classifies each target image into one of plural predetermined categories in accordance with classification rules that are set for the respective categories.

The display control unit 23 generates a control signal for controlling display on the display unit 24 and controls display on the display unit 24. For example, the display control unit 23 performs control so that a classification result obtained by the classification processing unit 22 is displayed on the display unit 24.

The display unit 24 displays various screens in accordance with the control signal output from the display control unit 23.

The operation accepting unit 25 accepts an operation input from the user. For example, in the case where the classification result obtained by the classification processing unit 22 is incorrect, the operation accepting unit 25 accepts an operation for correcting classification from the user.

The mask processing unit 26 performs a masking process on a target image in the case where an operation for correcting classification is performed, that is, in the case where an operation for correcting the category of the classified target image to another category is performed. At that time, the mask processing unit 26 performs a masking process on the target image in accordance with the correct category corrected by the user.

Specifically, in accordance with the classification rule for the correct category, the mask processing unit 26 generates an image (hereinafter, referred to as a mask image) for leaving a region specified by the classification rule unmasked and masking another region not including the region specified by the classification rule by blacking out the other region. Then, the mask processing unit 26 generates an image (hereinafter, referred to as a secure image) by combining the target image and the mask image together. By combining the target image and the mask image together, a portion of the target image is masked. In the exemplary embodiment, an image of the portion that is masked in the target image is used as an example of a first image.

The image data storage unit 27 stores the image data received by the image data receiving unit 21. Specifically, the image data storage unit 27 stores a target image in the case where no approval is obtained for transmission of the incorrectly classified image to outside in the in-house procedure.

The transmission unit 28 transmits the secure image generated by the mask processing unit 26 to a specified outside location (i.e., a maintenance personnel or the like). Specifically, the transmission unit 28 transmits the secure image to the specified outside location via the network 30 or the like in response to the user performing an operation for transmitting the secure image to outside. The transmission unit 28 transmits, together with the secure image, information concerning the incorrect category determined by the classification processing unit 22 in classification and the correct category determined by the user.

Note that these functional units of the terminal apparatus 20 are implemented as a result of software and hardware resources operate in cooperation with each other. Specifically, the CPU 201 loads a program for implementing the functional units of the terminal apparatus 20, for example, from the magnetic disk device 203 to the main memory 202 and executes the program, whereby these functional units are implemented. In addition, the display unit 24 is implemented by the display system 205, for example. The image data storage unit 27 is implemented by the magnetic disk device 203, for example.

In the exemplary embodiment, the classification processing unit 22 has an exemplary function of a classifying unit. The mask processing unit 26 has an exemplary function of a replacing unit. The display control unit 23 has an exemplary function of a display. The operation accepting unit 25 has an exemplary function of an accepting unit. The transmission unit 28 has an exemplary function of an output unit.

Description about Category Correction Timing

Figure 5A:
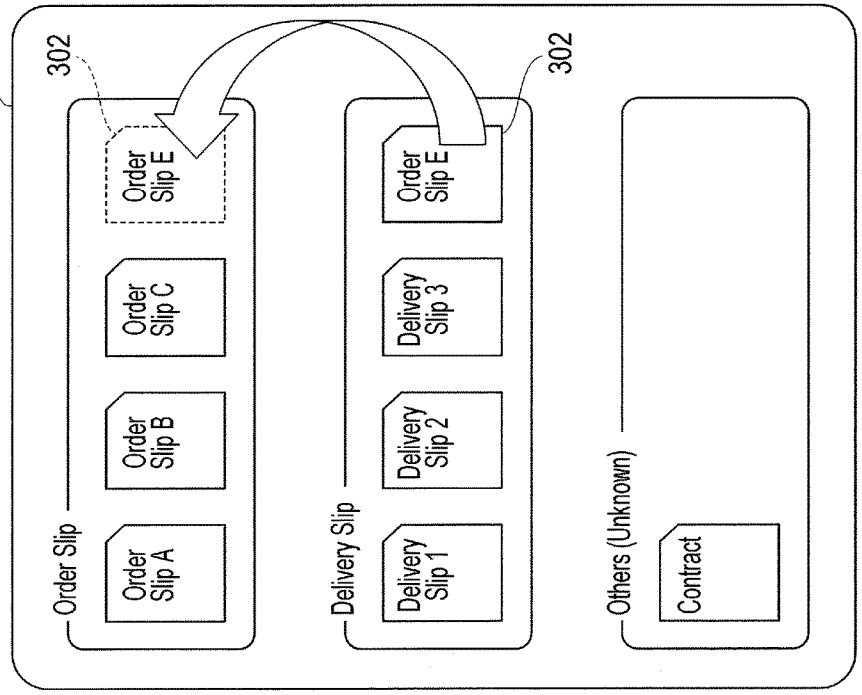
FIGS. 5A and 5B describe examples of timing at which a category is corrected.
Figure 5B:
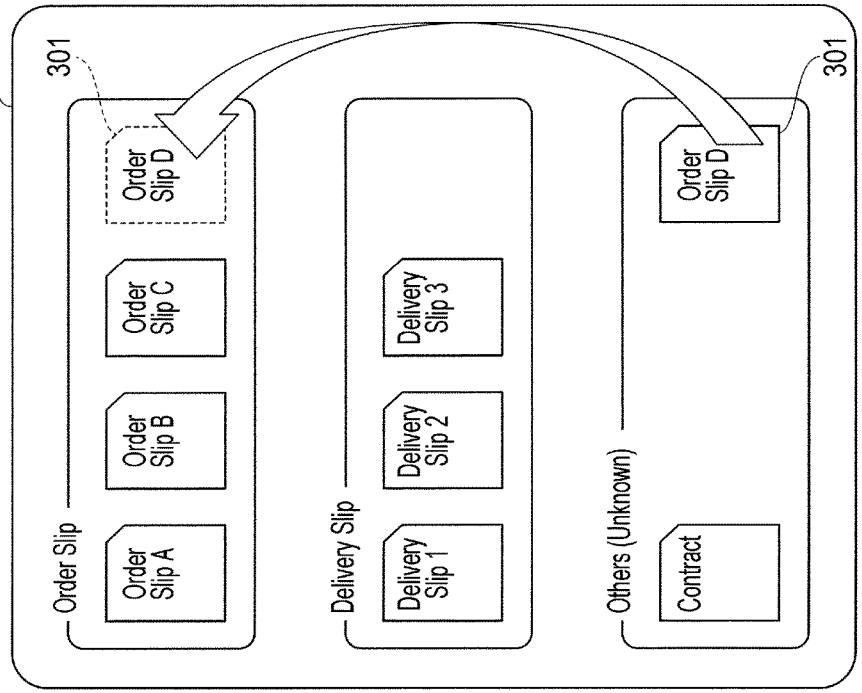

A description will now be given of timing at which the category is corrected in the case where classification performed by the classification processing unit 22 is incorrect. FIGS. 5A and 5B describe examples of timing at which the category is corrected. As illustrated in FIGS. 5A and 5B, a classification result is displayed on a screen of the display unit 24 after classification of target images is performed by the classification processing unit 22. In these examples, categories "Order Slip" and "Delivery Slip" are predetermined, and target images that are not classified into these categories are classified into a category "Others (Unknown)".

In the example illustrated in FIG. 5A, target images "Order Slip A", "Order Slip B", and "Order Slip C" are classified into the category "Order Slip". In addition, target images "Delivery Slip 1", "Delivery Slip 2", and "Delivery Slip 3" are classified into the category "Delivery Slip". Further, a target image "Contract" is classified into the category "Others (Unknown)". Although a target image 301 "Delivery Slip D" is classified into the category "Others (Unknown)" in this example, the target image 301 is supposed to be classified into the category "Order Slip". That is, although the form corresponding to the target image 301 is an order slip, the target image 301 is not classified into the category "Order Slip" but is classified into the category "Others (Unknown)" for some reason, for example, a character string "Order Slip" not being correctly recognized by OCR.

The user views the classification result screen and recognizes that the target image 301 is not classified into the category "Order Slip" but is classified into the category "Others (Unknown)". Accordingly, the user performs an operation for correcting the category of the target image 301 from the category "Others (Unknown)" to the category "Order Slip". For example, the user corrects the category by selecting the target image 301 and moving the target image 301 from a section for "Others (Unknown)" to a section for "Order Slip" with a mouse or the like.

As in the example illustrated in FIG. 5A, in the example illustrated in FIG. 5B, the target images "Order Slip A", "Order Slip B", and "Order Slip C" are classified into the category "Order Slip". In addition, the target images "Delivery Slip 1", "Delivery Slip 2", and "Delivery Slip 3" are classified into the category "Delivery Slip". Further, the target image "Contract" is classified into the category "Others (Unknown)". Although a target image 302 "Order Slip E" is classified into the category "Delivery Slip" in this example, the target image 302 is supposed to be classified into the category "Order Slip". That is, although the form corresponding to the target image 302 is an order slip, the target image 302 is not classified into the category "Order Slip" but is classified into the category "Delivery Slip" for some reason, for example, the target image 302 also including a description regarding delivery.

The user views the classification result screen and recognizes that the target image 302 is not classified into the category "Order Slip" but is classified into the category "Delivery Slip". Accordingly, the user corrects the category, for example, by moving the target image 302 from the section for "Delivery Slip" to the section for "Order Slip" with a mouse or the like.

Description about Masking Process in response to Category Correction

A description will now be given of a making process that is performed in response to an operation for correcting the category. FIGS. 6A to 6D describe an example of the masking process that is performed in response to an operation for correcting the category.

Figure 6A:
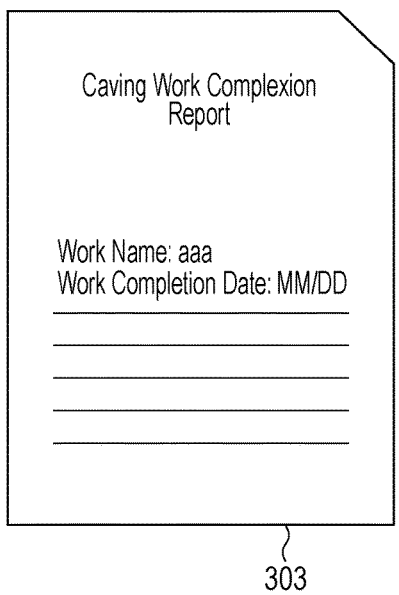
FIGS. 6A to 6D describe an example of a masking process that is performed in response to an operation for correcting a category.

Specifically, FIG. 6A illustrates an example of a target image 303 that is classified incorrectly. The target image 303 illustrated in FIG. 6A includes confidential information such as "Work Name" and "Work Completion Date". The heading of the target image 303 is supposed to be recognized as "Paving Work Completion Report" by OCR; however, it is incorrectly recognized as "Caving Work Complexion Report". As a result, the target image 303 is classified into, for example, the category "Others (Unknown)" instead of a category "Paving Work Completion Report" to which the target image 303 is supposed to be classified. The user views the classification result displayed on the display unit 24 and performs an operation for correcting the category of the target image 303 to the category "Paving Work Completion Report".

In response to the user performing an operation for correcting the category, the mask processing unit 26 performs a masking process on the target image 303. Specifically, the mask processing unit 26 generates a mask image in accordance with the classification rule for the correct category. As for the example illustrated in FIG. 6A, a mask image is generated in accordance with the classification rule for the correct category "Paving Work Completion Report".

For example, it is assumed that the classification rule for the category "Paving Work Completion Report" is set such that the target image is classified into the category "Paving Work Completion Report" if a region specified by coordinate information includes a character string "Paving Work Completion Report" as described above. Accordingly, the mask processing unit 26 generates a mask image by leaving the region specified by the classification rule unmasked and by blacking out another region not including the specified region.

Figure 6B:
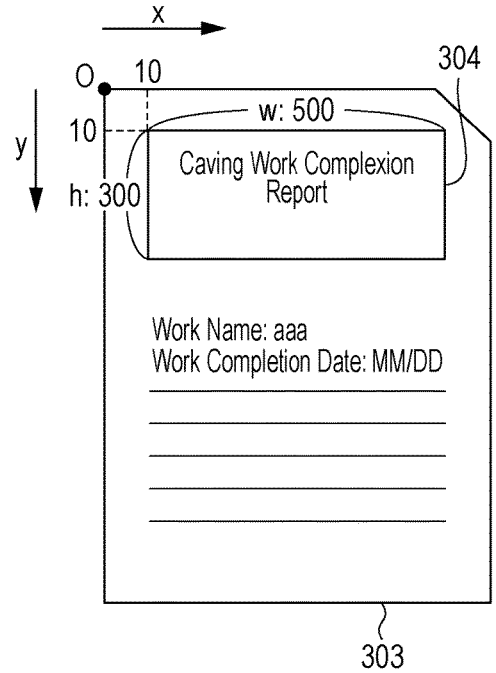

FIG. 6B illustrates an example of the region specified by the classification rule. In this example, by using the orthogonal coordinate system in which the upper left corner of the target image 303 serves as the origin O, the right direction in FIG. 6B serves as the x axis, and the down direction in FIG. 6B serves as the y axis, a position in the target image 303 is represented by an x coordinate value and a y coordinate value. A region 304, which is represented, for example, by x=10, y=10, w (width in the x direction)=500, and h (height in the y direction)=300, is specified by the classification rule. Note that the coordinate values representing the position in the target image 303 are calculated in accordance with, for example, the dimensions and the number of pixels of the target image 303.

Figure 6C:
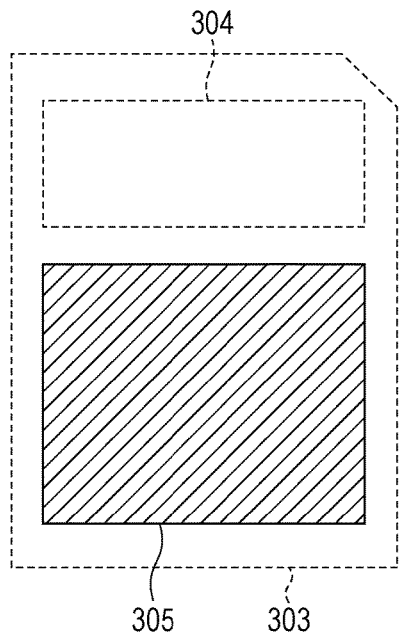

FIG. 6C illustrates an example of the generated mask image. A mask image 305 illustrated in FIG. 6C is obtained by blacking out a region in the target image 303 at least excluding the region 304 specified by the classification rule. That is, the mask image 305 is set as a region not including the region 304 in the target image 303.

Figure 6D:
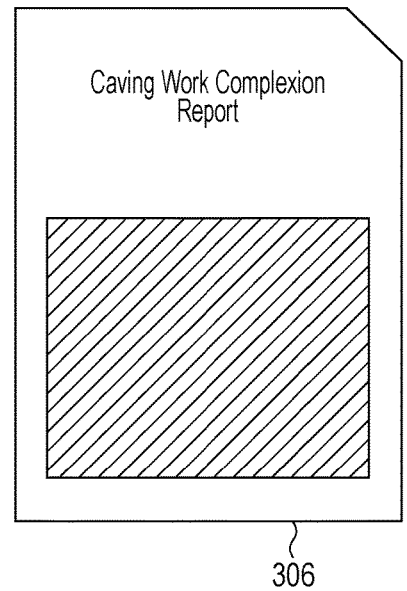

The mask processing unit 26 then combines the target image 303 and the mask image 305 together to generate a secure image 306 illustrated in FIG. 6D. In the secure image 306, the confidential information such as "Work Name" and "Work Completion Date" are hidden, whereas the character string "Caving Work Complexion Report" is not hidden. Therefore, the user just needs to check whether the confidential information such as "Work Name" and "Work Completion Date" is masked, that is, whether the confidential information is hidden by the mask image 305, by viewing the secure image 306 displayed on the display unit 24.

As described above, the mask processing unit 26 generates a mask image in accordance with a classification rule for the correct category. At that time, the mask processing unit 26 generates the mask image by blacking out a region not including a region specified by the classification rule.

The region specified by the classification rule includes information that is used (referred to) when the classification processing unit 22 classifies the target image. In other words, the classification processing unit 22 is supposed to classify the target image into the correct category by referring to a character string or the like included in this specified region. However, the target image is incorrectly classified for some reason, for example, OCR being unsuccessful. In order to investigate the cause of the incorrect classification, information concerning how characters are recognized in the region specified by the classification rule is needed.

Accordingly, in the exemplary embodiment, the region specified by the classification rule is left unmasked. However, processing for hiding confidential information is performed by masking (blacking out) a region other than the specified region.

That is, the mask processing unit 26 generates a mask image by leaving a part that is predetermined to perform classification into the correct category unmasked and by blacking out a region not including the part. In the exemplary embodiment, the region specified by the classification rule for the correct category is used as an example of a part that is predetermined to perform classification into the correct category. In addition, in the example illustrated in FIGS. 6A to 6D, the region 304 is used as an example of the part that is predetermined to perform classification into the correct category.

In the exemplary embodiment, a secure image is generated in this way. As a result, a part that is needed in investigation of the cause of the incorrect classification is left unmasked, and a region other than the part is masked to make confidential information hidden.

Description about Masking Process Based on User Operation

A description will now be given of a masking process that is performed based on a user operation. After the mask processing unit 26 generates a secure image, the generated secure image is displayed on the display unit 24. Then, the user checks the secure image. If confidential information is hidden by the mask image, the secure image just needs to be transmitted to a specified outside location; however, there may be confidential information that is not hidden. In such a case, the user performs an operation for specifying a portion to be masked so as to correct the masking position in the target image. The mask processing unit 26 then performs a masking process on the portion specified by the user. That is, the operation accepting unit 25 accepts, from the user, correction regarding a position at which a portion of the resulting target image is to be replaced with a second image.

Figure 7A:
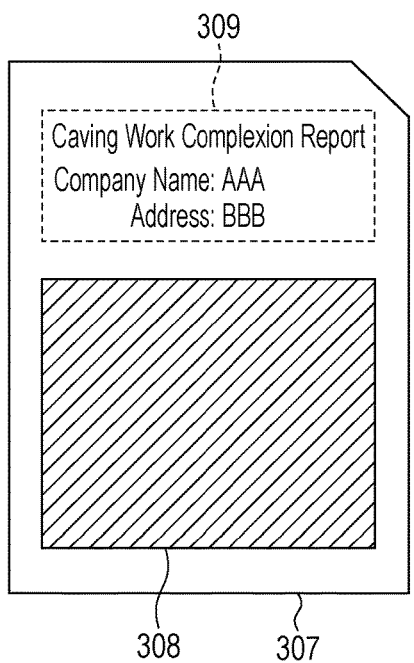
FIGS. 7A to 7C describe an example of the masking process that is performed based on a user operation.
Figure 7B:
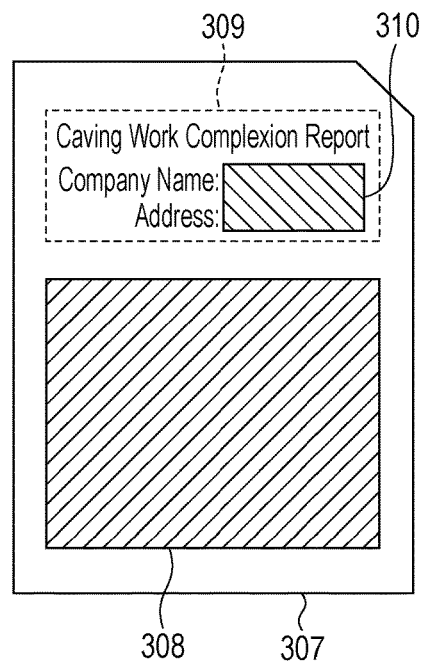
Figure 7C:
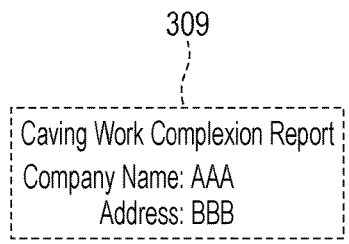

FIGS. 7A to 7C describe an example of the masking process that is performed based on a user operation.

FIG. 7A illustrates a secure image 307 that is generated as a result of the user correcting the incorrect category to the correct category "Paving Work Completion Report". In the secure image 307, a region 308 is masked, whereas a region 309 is left unmasked. That is, the region 309 is a region specified by the classification rule for the category "Paving Work Completion Report" and thus is left unmasked.

However, the region 309 includes confidential information such as the company name "AAA" and the address "BBB". Accordingly, the user checks the secure image 307 displayed on the display unit 24 and performs an operation for specifying a portion to be masked in the secure image 307. In this example, for example, the user performs an operation for specifying the confidential information such as the company name "AAA" and the address "BBB" in the region 309.

FIG. 7B illustrates an example of a secure image, a portion of which is masked based on the user operation. As a result of the user specifying the company name "AAA" and the address "BBB", a region 310 is masked (blacked out). If the user determines that the secure image 307 is suitable to be transmitted to outside after the portion to be masked has been specified by the user and the confidential information has been hidden, data of the secure image 307 is transmitted to a specified outside location.

The entirety of the secure image 307 may be displayed on the display unit 24 as illustrated in FIG. 7A; however, each region specified by the classification rule may be displayed so as to allow the user to mask the region while view it.

For example, an example illustrated in FIG. 7C illustrates a case where the region 309 illustrated in FIG. 7A alone is displayed on the display unit 24. In this example, in response to the user specifying, for example, the company name "AAA" and the address "BBB" as a portion to be masked, the masking process is performed on the portion. In addition, if there is a region specified by the classification rule other than the region 309, such a region is sequentially displayed and the user specifies a portion to be masked in each region. In this way, the specified portion is masked.

Another Example of Masking Process

A description will now be given of another example of the masking process performed by the mask processing unit 26. In the example illustrated in FIGS. 6A to 6D, the region specified by the classification rule is left unmasked. In addition, in the example illustrated in FIGS. 7A to 7C, if the unmasked region includes confidential information, the confidential information is masked when being specified by the user. In contrast, in the example described now, a portion to be masked is determined by searching information included in the region specified by the classification rule.

FIGS. 8A to 8C describe another example of the masking process.

For example, a target image 311 illustrated in FIG. 8A is supposed to be classified into the category "Paving Work Completion Report" but is classified into, for example, the category "Others (Unknown)". A region 312 is the region specified by the classification rule for the correct category "Paving Work Completion Report". The classification rule is set such that a target image is classified into the category "Paving Work Completion Report" if the region 312 includes a character string "Paving Work Completion Report". In addition, the region 312 includes confidential information such as the company name "AAA" and the address "BBB".

In this case, the confidential information such as the company name "AAA" and the address "BBB" is not hidden unless the region 312 is entirely masked as in the example illustrated in FIGS. 6A to 6D. Accordingly, in the example illustrated in FIGS. 8A to 8C, the mask processing unit 26 searches the region 312 for a character string related to the character string "Paving Work Completion Report" that is specified in advance. If the search target character string is found, the mask processing unit 26 generates a secure image by leaving the character string unmasked and by masking (blacking out) a region not including the character string.

This search is performed, for example, by using regular expressions. A regular expression is a technique for expressing a set of character strings by using a single format. FIG. 8B illustrates an example of regular expressions of the character string "Paving Work Completion Report". For example, regular expressions obtained by replacing one character of the character string "Paving Work Completion Report" with an asterisk (*) include "*aving Work Completion Report", "P*ving Work Completion Report", and "Paving Work Com*letion Report". Any character may be used for the asterisk (*). Similarly, regular expressions obtained by replacing each of two characters of the character string "Paving Work Completion Report" with an asterisk (*) include "**ving Work Completion Report", "*aving *ork Completion Report", and "*aving Work Com*letion Report", for example. Any character may be used for the asterisk (*).

The mask processing unit 26 searches the region 312 to determine whether the region 312 includes a character string that matches any of character strings obtained by using regular expressions for the character string "Paving Work Completion Report" specified in advance.

The character string "Caving Work Complexion Report" matches a regular expression "*aving Work Comple*ion Report" obtained by replacing each of two characters of the character string "Paving Work Completion Report" with an asterisk. That is, in the character string "Caving Work Complexion Report", the first character (P) of the first word (Paving) and the seventh character (t) of the third word (Completion) of the character string "Paving Work Completion Report" are respectively replaced with "C" and "x". Accordingly, the mask processing unit 26 determines that the search target character string is found in the region 312 and generates a secure image 313 by leaving the character string "Caving Work Complexion Report" unmasked and by blacking out a region not including the character string. In this example, the character string "Caving Work Complexion Report" is used as an example of a character string obtained by using a regular expression for a character string specified in advance for the correct category.

In the example illustrated in FIGS. 8A to 8C, the secure image 313 is generated in this way. As a result, a portion that is supposed to be used for classification in the region specified by the classification rule is left unmasked, and a region other than the portion is masked to make confidential information hidden.

Description about Procedure of Masking Process

A description will now be given of a procedure of the masking process performed by the terminal apparatus 20. FIG. 9 is a flowchart illustrating an example of the procedure of the masking process.

First, the image data receiving unit 21 receives image data from the image scanning apparatus 10 via the network 30 (step S101). Then, the classification processing unit 22 classifies the image data (target image), for example, by using OCR (step S102). Then, the display control unit 23 performs control so as to display a screen allowing the user to check the classification result of the target image on the display unit 24 (step S103). Then, the user views the classification result displayed on the display unit 24 and checks whether the target image is classified into the correct category. If the classification result is incorrect, the user performs an operation for correcting the category. That is, the user performs an operation for selecting the incorrectly classified target image from among the target images displayed on the display unit 24 and correcting the category of the selected target image.

The mask processing unit 26 determines whether an operation for correcting the category is performed (step S104). If it is determined that no operation for correcting the category is performed (NO in step S104), the flow of this process ends. In contrast, if it is determined that an operation for correcting the category is performed (YES in step S104), the mask processing unit 26 generates a secure image by masking a portion of the target image (step S105).

In step S105, a mask image is generated in accordance with the classification rule for the correct category. The generated mask image and the target image are combined together, whereby the secure image is generated. After the secure image is generated, the display control unit 23 performs control so as to display a screen allowing the user to check the generated secure image on the display unit 24 (step S106). Then, the user views the displayed secure image and checks whether confidential information is hidden. The user also performs an in-house procedure to obtain an approval for taking the secure image out if needed. If the confidential information is hidden and an approval for taking out is obtained, the user performs an operation for transmitting the secure image to a specified outside location.

The mask processing unit 26 determines whether an operation for transmitting the secure image to a specified outside location is performed (step S107). If it is determined that an operation for transmitting the secure image is performed (YES in step S107), the transmission unit 28 transmits data of the secure image to the specified outside location (step S108). At that time, the transmission unit 28 transmits, along with the data of the secure image, information concerning the incorrect category determined in classification and the correct category to the specified outside location. The data transmitted to the specified outside location is used to investigate the cause why the target image is incorrectly classified. Then, the flow of this process ends.

On the other hand, if it is determined that no operation for transmitting the secure image is performed (NO in step S107), the mask processing unit 26 determines whether an operation for specifying a portion to be masked is performed (step S109). If it is determined that an operation for specifying a portion to be masked is performed (YES in step S109), the mask processing unit 26 performs a masking process on the specified portion based on the user operation (step S110). The process then proceeds to step S108.

In the case where an approval for taking out is not obtained, no operation for specifying a portion to be masked is performed (NO in step S109). In such a case, the mask processing unit 26 stores data of the secure image in the image data storage unit 27 (step S111). In this case, for example, a maintenance personnel or the like visits a place where the terminal apparatus 20 is installed, directly acquires the data of the secure image from the image data storage unit 27, and investigates the cause of the incorrect classification. Then, the flow of this process ends.

As described above, in the exemplary embodiment, the terminal apparatus 20 classifies a target image. If the classification result is corrected, the terminal apparatus 20 generates a secure image by masking a portion of the target image. In the generated secure image, a part used for classification is left unmasked, whereas a region not including the part used for classification is masked. That is, in the secure image, information necessary for investigating the cause of the incorrect classification is left unmasked, whereas confidential information included in the other region is masked. Then, data of the secure image is transmitted to a specified outside location.

In the exemplary embodiment, a region is specified in the target image by the classification rule; however, the configuration is not limited to this one. In the case where any region is not specified in the target image by the classification rule, the classification processing unit 22 classifies the target image by referring to the entirety of the target image. In addition, in the case where the classification result is corrected, if any region is not specified in the target image by the classification rule for the correct category, the mask processing unit 26 searches for any of character strings obtained by using regular expressions, by referring to the entirety of the target image, as described for example in FIGS. 8A to 8C. Then, a secure image is generated by leaving a part found in this search unmasked and by masking the other region.

Further, in the exemplary embodiment, the configuration of the terminal apparatus 20 is not limited to a configuration for classifying a target image by using character recognition. For example, the terminal apparatus 20 may classify the target image by recognizing a figure, an illustration, a ruled line, or the like.

In addition, in the exemplary embodiment, the terminal apparatus 20 masks a portion of the target image; however, the configuration is not limited to this one. The terminal apparatus 20 may perform any processing for replacing a portion of the target image with another image to make confidential information not recognizable. That is, the terminal apparatus 20 may, instead of masking a certain region of the target image, replace the region with an image not including contents of the region, for example, by processing data to make the contents of the region not recognizable or by removing character data from the region.

In the exemplary embodiment, the image scanning apparatus 10 may have the functions of the terminal apparatus 20. In such a case, the image scanning apparatus 10 scans an image on a document and classifies the scanned image (target image). If the classification result is corrected, the image scanning apparatus 10 generates a secure image by masking a portion of the target image. In this case, the image scanning apparatus 10 may be considered as an example of an image processing apparatus.

In addition, a program that implements the exemplary embodiment of the present invention may be provided via a communication medium and may be provided after being stored on a recording medium, such as a Compact Disc-Read Only Memory (CD-ROM).

While the present invention has been described by using the exemplary embodiment, the technical scope of the present invention is not limited to the exemplary embodiment described above. It is obvious to a person skilled in the art that various modifications and alterations are adoptable without departing from the sprit and scope of the present invention.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a classifying unit that classifies an input image into a category;
an operation accepting unit that accepts from a user an operation for correcting the category; and
a replacing unit that, if the category from the classifying unit is corrected by the user to a correct category, replaces with a first image a region of the input image in accordance with the correct category, the region not including a part that is predetermined to perform classification into the correct category.

2. The image processing apparatus according to claim 1, wherein the replacing unit replaces the region of the input image with the first image that is an image not including contents of the region.

3. The image processing apparatus according to claim 1, wherein the replacing unit replaces the region of the input image with the first image by masking the region of the input image.

4. The image processing apparatus according to claim 1, wherein the replacing unit identifies, in the input image, a character string obtained by using a regular expression for a character string that is specified in advance for the correct category, as the part that is predetermined to perform classification into the correct category, and replaces a region not including the identified character string with the first image.

5. The image processing apparatus according to claim 1, further comprising:
a display that displays a screen allowing the user to check a resulting image obtained as a result of the replacing unit replacing the region of the input image.

6. The image processing apparatus according to claim 1, further comprising:
an accepting unit that accepts, from the user, correction regarding a position to be replaced with a second image in the input image whose region has been replaced with the first image by the replacing unit.

7. The image processing apparatus according to claim 1, further comprising:
an output unit that outputs a resulting image obtained as a result of the replacing unit replacing the region of the input image and a classification result obtained by the classifying unit.

8. The image processing apparatus according to claim 1, wherein the category is a type of document.

9. A non-transitory computer readable medium storing a program causing a computer to execute a process for image processing, the process comprising:
classifying an input image into a category;
accepting from a user an operation for correcting the category; and
if the category into which the input image is classified is corrected by the user to a correct category, replacing with a first image a region of the input image in accordance with the correct category, the region not including a part that is predetermined to perform classification into the correct category.

10. The non-transitory computer readable medium according to claim 9, wherein in the replacing, the region of the input image is replaced with the first image that is an image not including contents of the region.

11. The non-transitory computer readable medium according to claim 9, wherein in the replacing, the region of the input image is replaced with the first image by being masked.

12. The non-transitory computer readable medium according to claim 9, wherein in the replacing, a character string obtained by using a regular expression for a character string that is specified in advance for the correct category is identified as the part that is predetermined to perform classification into the correct category in the input image, and a region not including the identified character string is replaced with the first image.

13. The non-transitory computer readable medium according to claim 9, the process further comprising:
displaying a screen allowing the user to check a resulting image obtained as a result of replacing the region of the input image in the replacing.

14. The non-transitory computer readable medium according to claim 9, the process further comprising:
accepting, from the user, correction regarding a position to be replaced with a second image in the input image whose region has been replaced with the first image in the replacing.

15. The non-transitory computer readable medium according to claim 9, the process further comprising:
outputting a resulting image obtained as a result of replacing the region of the input image in the replacing and a classification result obtained in the classifying.

* * * * *